United States Patent

Dezelan et al.

[11] 3,886,072
[45] May 27, 1975

[54] FILTER RETAINER AND BYPASS VALVE ASSEMBLY

[75] Inventors: Joseph E. Dezelan; John A. Junck; Neil W. Kroth, all of Joilet, Ill.

[73] Assignee: Caterpillar Tractor Co., Peoria, Ill.

[22] Filed: Apr. 30, 1973

[21] Appl. No.: 355,474

[52] U.S. Cl. ............... 210/130; 210/439; 210/441
[51] Int. Cl. ........................................... B01d 27/10
[58] Field of Search ........... 210/130, 131, 132, 232, 210/437, 452

[56] References Cited
UNITED STATES PATENTS

| | | | |
|---|---|---|---|
| 3,368,680 | 2/1968 | Bozek | 210/130 |
| 3,487,930 | 1/1970 | Rosaen | 210/130 |
| 3,653,512 | 4/1972 | Brown | 210/130 |
| 3,675,777 | 7/1972 | Heskett et al. | 210/232 |

Primary Examiner—Samih N. Zaharna
Assistant Examiner—Ferris H. Lander
Attorney, Agent, or Firm—Phillips, Moore, Weissen-berger, Lempio & Strabala

[57] ABSTRACT

A filter assembly includes a housing within which is disposed a filter element. Inlet means direct fluid to the filter, through which such fluid normally flows. The fluid then normally flows through outlet means defined by the housing. The fluid flowing through the inlet means is in communication with a valve including a valving element movable toward the filter element to allow fluid to flow from the inlet means to the outlet means, bypassing the filter element. A helical spring is disposed between the valving element and filter element to bias the valving element in a position so that the fluid is normally directed through the filter element. An increase of the fluid pressure in the filter element moves the valve element toward the filter element against the resilience of the spring, so that the fluid bypasses the filter element.

5 Claims, 1 Drawing Figure

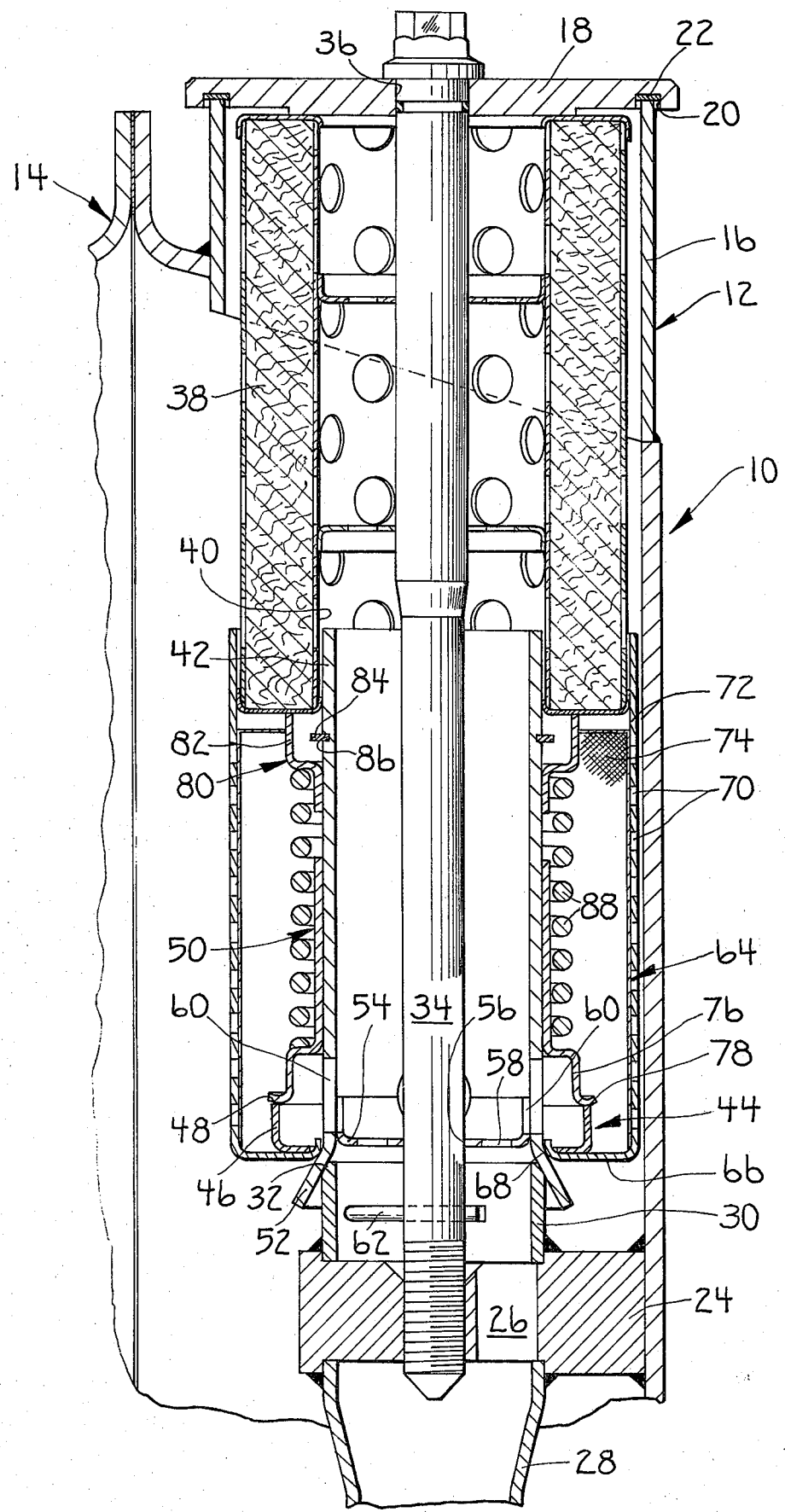

FILTER RETAINER AND BYPASS VALVE ASSEMBLY

BACKGROUND OF THE INVENTION

This invention relates to a filter assembly, and more particularly, to a filter assembly incorporating a bypass valve.

Hydraulic circuits and oil lubricating systems generally employ filters to remove contaminants from the fluid. Because of the need for continuous supply of fluid and to prevent rupture of the filter element and the consequent contamination of the fluid, these filter assemblies are provided with a bypass valve. The bypass valve is designed to open when the filter becomes so clogged as to cause a predetermined pressure rise in the fluid circuit. The opening of the valve permits fluid to bypass the filter element to supply the demands of the system.

In the prior art, various filter assemblies of such type are known. Of such prior art filter assemblies, a large percentage incorporates resilient helical springs and/or movable valving elements which extend inwardly of the cylindrical center bore of the filter element. (See, for example, U.S. Pat. No. 3,235,085 to Humbert, U.S. Pat. No. 3,184,062 to Humbert, U.S. Pat. No. 3,221,880 to Wilkinson, U.S. Pat. No. 3,426,900 to Wilkinson et al, U.S. Pat. No. 3,085,688 to Eberle, U.S. Pat. No. 3,556,300 to Codo, U.S. Pat. No. 3,572,508 to Rice, and U.S. Pat. No. 3,628,661 to Codo, the last three mentioned references assigned to the Assignee of this invention.) Such a system, while being effective in use, generally requires the extremely careful design and manufacture of the valving parts involved, many of which have heretofore been castings, adding to the overall cost of the device.

U.S. Pat. No. 3,313,418 to Rosaen discloses a device (FIG. 4) which avoids the use of resilient springs and/or valving elements which protrude into the filter element. However, a study of that patent reveals that the structure involved therein is still relatively complicated in design and construction, involving a relatively complex baffle member with numerous slots and channels defined therein for use in cooperation with the actual movable valving element thereof.

SUMMARY OF THE INVENTION

It is therefore an object of this invention to provide a filter assembly having a pressure responsive bypass valve and associated structure which is free of the bore of the filter element of the assembly.

It is a further object of this invention to provide a filter assembly which, while fulfilling the above object, is extremely simple and inexpensive in design and construction, avoiding the use of cast parts where possible.

It is a still further object of this invention to provide a filter assembly which, while fulfilling the above objects, provides means for aiding in the simple installation of the filter assembly.

Broadly stated, the filter assembly disclosed herein comprises a housing comprising a housing body and an end cover and includes fluid inlet and outlet means. An annular filter element is disposed within the housing adjacent the end cover. Fluid directing means are included for directing the fluid from the fluid inlet means through the filter element. Valve means are associated with the fluid directing means and comprise a valving element movable to a first position away from the filter element so that the fluid directing means direct fluid from the fluid inlet means through the filter element. The valving element is movable away from the first position toward the filter element to allow fluid to flow from the fluid inlet means to the fluid outlet means, bypassing the filter element. Resilient means are interposed the valving element and filter element, the valving element being biased thereby into the first position and being movable toward the filter element against the resilience thereof, the valve means being subjected to the fluid pressure of the fluid introduced through the fluid inlet means to the filter element so that the valving element moves toward the filter element upon increased fluid pressure built up in the filter element.

BRIEF DESCRIPTION OF THE DRAWINGS

These and other objects of the invention will become apparent from a study of the following specification and drawing, which is a longitudinal sectional view of a filter assembly embodying the present invention.

DESCRIPTION OF THE PREFERRED EMBODIMENT

As shown in the drawing, a filter retainer and bypass valve assembly is generally indicated by the reference numeral 10. The filter assembly 10 includes a housing 12 which makes up a portion of a fluid retainer tank 14. The housing 12 includes a cylindrical housing body 16 and an end cover 18 which is provided with an annular groove 20 which receives a seal 22 for sealing engagement with the cylindrical body 16. A mounting bracket 24 is integrally secured to the inside of the housing body 16, and has a passage 26 extending therethrough. A first inlet pipe 28 is secured to the lower side of the bracket 24, and a second inlet pipe 30 is secured to the upper side of the bracket 24, communicating with the inlet pipe 28 through the passage 26. A tapered seat 32 is formed on the upper end of the inlet pipe 30. An elongated bolt 34 extends through a central aperture 36 in the cover 18 and is threadably secured to the mounting bracket 24 for holding the end cover 18 in place.

An annular filter element 38 is disposed within the housing body 16 against the end cover 18. The filter element 38 is of tubular configuration and has a tubular center bore 40. Fluid directing means in the form of a tubular member 42 interconnects the inlet pipe 30 and the filter element 38, extending into and communicating with the bore 40 of the filter element 38. Such tubular member 42 directs fluid from the inlet pipe 30 through the filter element 38, and from the filter element 38 outwardly thereof and back into the retainer tank 14. Thus, the fluid outlet means of the housing body 16 communicate directly with the tank 14.

A bypass valve assembly 44 includes an annular valve seat member 46 disposed about the tubular member 42 and defining a valve seat 48, and a substantially tubular valving element 50 disposed about the tubular member 42 and slidable therealong. The tubular member 42 defines a flared portion 52 which generally surrounds and is in annular sealing contact with the end of the inlet pipe 30 which is most adjacent the filter element 38.

A cup-shaped member 54 is secured within the tubular member 42 adjacent to but elevationally spaced from the flared portion 52. A centrally disposed aperture 56 and a plurality of passages 58 extend through the cup-shaped member 54, with the bolts 34 extending through the central aperture 56. A plurality of passages 60 are provided in the flanged portion of the cup-shaped member 54, and the wall of the tubular member 42. A cotter pin 62 is disposed rotatably in a hole in the bolt 34 below the cup-shaped member 54, the function of such cotter pin 62 being fully described in U.S. Pat. No. 3,556,300 cited above. A cylindrical casing 64 has a bottom wall 66 with a centrally disposed aperture 68 formed thereon. The aperture 68 is slidably disposed upon the tubular member 42 and is adapted for sealing engagement with the outside of the flared portion 52. A multiplicity of apertures 70 extend through the wall 72 of the casing 64. A screen member 74 is associated with the housing 12, nested within the casing 64.

The valve seat member 46 is supported by the bottom wall 66 of the casing 64. The valving element 50 defines an enlarged portion 76 which terminates in an annular rim 78 which is adapted for sealing engagement with the seat 48. A ring member 80 is slidably disposed about the tubular member 42 and is axially and elevationally spaced from the valving element 50. The ring member 80 has an enlarged portion 82 formed thereon which is adapted for sealing engagement with the end of the filter element 38. A snap ring 84 is seated within an annular groove 86 formed in the tubular member 42, for retaining the ring member 80 on the tubular member 42.

A helical spring 88 is disposed about the tubular member 42, and is interposed the filter element 38 and the valving element 50, actually being in contact with the ring member 80 and the valving element 50. The spring 88 resiliently urges the valving element 50 into a first position as shown in the drawing away from the filter element 38 and into sealing relation with the seat 48, and the enlarged portion 82 of the ring member 80 into sealing engagement with the filter element 38, biasing such elements in such positions.

When the assembly 10 is in operation, the components are installed as shown. Fluid from a hydraulic system (not shown) is transmitted through inlet pipe 28, passage 30, inlet pipe 26, passages 58 in the cup-shaped member 54, tubular member 42, and into the filter element 38, all of which is allowed to take place with the valving element 50 in its first position as shown in the drawings, i.e., positioned in the direction away from the filter element 38.

The fluid entering the assembly 10 is also transmitted through the passages 60 to the valving element 50 and valve seat member 46 to subject them to such fluid pressure. Such fluid exerts an upward force on the valving element 50. Under normal conditions, the pressure of the fluid is insufficient to unseat the valving element 50 from the seat member 46. However, should the filter become clogged with particles filtered from the fluid, a fluid pressure buildup in the filter 38 occurs. Because of such buildup, an upward force is exerted on the valving element 50 sufficient to move the valving element 50 away from the first position toward the filter element 38 against the resilience of the spring 80, whereby the valving element 50 is unseated from the seat member 46, allowing fluid to bypass the filter element 38 and return directly to the tank 14 through the screen 74 and the apertures 70 in the casing 64.

To replace the filter element 38, the bolt 34 is unscrewed from the bracket 24 and withdrawn. The filter element 38 and bypass valve assembly 44 are retained on the bolts 34 as it is withdrawn, by engagement between the cup-shaped member 54 and the cotter pin 62. Once the assembly is withdrawn from the tank 14, the mechanic aligns the cotter pin 62 with the slots, not shown, in the cup-shaped member 54, and slips the bypass valve assembly 44 off the end of the bolt 34. The filter element 38 may then be freely removed from the bolt 34. The bypass valve assembly 44 is maintained in an assembled condition on the tubular member 42 by the snap ring 84. To install a new element 38, the foregoing steps are reversed.

It will be seen that herein is provided a filter assembly which is extremely simple in design and effective in use. The bypass valve components thereof, and other associated structure may be formed of sheet metal, avoiding the complication and high cost of cast parts in this area. The assembly, being directly associated with a fluid retainer tank or reservoir 14, eliminates the need for a separate filter housing. In addition, the flared portion 52 described above pilots the filter retainer and bypass assembly into place during installation, making such installation quite convenient.

What is claimed is:

1. A filter assembly comprising:

a housing comprising a housing body and an end cover, and including fluid inlet and outlet means; said inlet means comprising an inlet pipe an annular filter element within said housing adjacent the end cover;

fluid directing means for directing the fluid from the fluid inlet pipe through the filter element and comprising a tubular member having one end portion thereof surrounding and in contact with said inlet pipe, and the opposite end adjacent the filter element, said one end being flared;

valve means associated with said tubular member and comprising a tubular valving element movable to a first position away from the filter element so that the fluid directing means direct fluid from the fluid inlet pipe through the filter element, and movable away from the first position toward the filter element to allow fluid to flow from the fluid inlet means to the fluid outlet means, bypassing the filter element;

ring means slidably mounted about said tubular member adjacent said opposite end thereof, said tubular valving element; resilient means interposed the valving element and the ring means urging the valve means and the ring means towards opposite ends of said tubular member, with the valving element being urged about said tubular member, means associated with said valve seat member and said flared end of the tubular member to prevent the sliding of said valve seat member and said valving element off said tubular member, retaining means disposed on said tubular member adjacent said opposite end thereof to prevent said ring means from sliding off of the opposite end of said tubular member, the tubular member defining passage means to allow fluid in the tubular member to reach the valving element and valve seat member to subject them to fluid pressure introduced through the fluid inlet pipe to the filter element, the valving element and valve seat member being configured so that the valving element moves toward the filter element upon fluid pressure buildup in the filter element.

2. The filter assembly of claim 1 and further comprising a fluid retainer tank and wherein said fluid retainer tank comprises said housing body and end cover.

3. The filter assembly of claim 1 and further comprising a screen member associated with the housing, through which the fluid which flows from the fluid inlet means to the fluid outlet means, bypassing the filter element, is directed.

4. The filter assembly of claim 3 wherein the annular filter element comprises a tubular filter element having a tubular center bore, the tubular member communicating with the tubular bore.

5. The filter assembly of claim 4 wherein the resilient member comprises a helical spring disposed about the tubular member.

* * * * *

UNITED STATES PATENT AND TRADEMARK OFFICE
CERTIFICATE OF CORRECTION

PATENT NO. : 3,886,072
DATED : May 27, 1975
INVENTOR(S) : JOSEPH E. DEZELAN et al

It is certified that error appears in the above-identified patent and that said Letters Patent are hereby corrected as shown below:

Col. 4, Claim 1, lines 46 and 47, after "thereof," delete:

"said tubular valving element" and insert:

-- said tubular valving element disposed about said tubular member and slidable therealong --.

line 51, after "urged" insert:

--away from the filter element under the resilience of the resilient means into the first position to seat on the valve seat member mounted--.

Signed and Sealed this

Seventh Day of June 1977

[SEAL]

Attest:

RUTH C. MASON
Attesting Officer

C. MARSHALL DANN
Commissioner of Patents and Trademarks